United States Patent
Allard et al.

(10) Patent No.: US 11,302,287 B1
(45) Date of Patent: Apr. 12, 2022

(54) COLOR CORRECTION IN COMPUTING SYSTEMS FOR COLOR VISION DEFICIENCY

(71) Applicant: Microsoft Technology Licensing, LLC, Redmond, WA (US)

(72) Inventors: Ashley Nicole Allard, Redmond, WA (US); Paul John Olczak, Seattle, WA (US); Charles Claudius Marais, Duvall, WA (US); Ioana Monica Preda, Bothell, WA (US); Kevin Hampton Cogger, Redmond, WA (US); Michael Paul Erich Von Hippel, Bellevue, WA (US); Aresh Mishra, Bhopal (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/094,106

(22) Filed: Nov. 10, 2020

(51) Int. Cl.
  *G09G 5/04* (2006.01)
  *G06T 5/00* (2006.01)
  *G09G 5/06* (2006.01)
  *G06T 1/20* (2006.01)
  *G09G 5/36* (2006.01)

(52) U.S. Cl.
  CPC .............. *G09G 5/04* (2013.01); *G06T 1/20* (2013.01); *G06T 5/009* (2013.01); *G09G 5/06* (2013.01); *G09G 5/363* (2013.01); *G06T 2207/20208* (2013.01); *G09G 2320/0666* (2013.01); *G09G 2340/06* (2013.01)

(58) Field of Classification Search
  None
  See application file for complete search history.

(56) References Cited

U.S. PATENT DOCUMENTS

| 6,931,151 B2 | 8/2005 | Weast |
| 6,985,524 B1 | 1/2006 | Borchers |

(Continued)

FOREIGN PATENT DOCUMENTS

| WO | 2008032528 A1 | 3/2008 |
| WO | 2016036860 A1 | 3/2016 |

OTHER PUBLICATIONS

"CIE 1931 color space", Retrieved from: https://en.wikipedia.org/wiki/CIE_1931_color_space, Retrieved Date: Sep. 3, 2020, 13 Pages.

(Continued)

*Primary Examiner* — Patrick F Valdez (57) ABSTRACT

Color correction technology for computing and gaming systems are discussed herein which compensate for color vision deficiency among individuals. In one example, a method includes receiving a video frame having a first non-linear transfer function and processing the video frame to have a linear transfer function. The method also includes applying a color transform to the video frame having the linear transfer function to produce at least altered color appearance parameters on selected colors that increase color perceptibility of the video frame for a colorblindness condition, and processing the video frame after the color transform to have a second non-linear transfer function and (Continued)

produce an output video frame. The method also includes transferring the output video frame for display on a display device.

15 Claims, 6 Drawing Sheets

(56) References Cited

U.S. PATENT DOCUMENTS

| | | | |
|---|---|---|---|
| 9,398,844 B2 | 7/2016 | Ambrus et al. | |
| 9,826,898 B1 | 11/2017 | Jin et al. | |
| 10,101,895 B2 | 10/2018 | Douglas et al. | |
| 10,424,097 B2 | 9/2019 | Vembar et al. | |
| 2003/0011616 A1* | 1/2003 | D'Souza | G09G 5/02 345/600 |
| 2016/0155245 A1* | 6/2016 | Stauder | G06T 11/001 382/167 |
| 2017/0110089 A1* | 4/2017 | Douglas | G06F 3/04897 |
| 2018/0027262 A1* | 1/2018 | Reinhard | H04N 19/186 382/166 |
| 2018/0043257 A1* | 2/2018 | Stevens | A63F 13/79 |
| 2019/0139201 A1 | 5/2019 | Eto | |
| 2020/0020138 A1 | 1/2020 | Smith et al. | |
| 2020/0099909 A1 | 3/2020 | Borer et al. | |

OTHER PUBLICATIONS

Saurel, Sylvain, "Discover how to fix your color blind problems on Android devices with the Color Correction mode", Retrieved from: https://medium.com/@ssaurel/discover-how-to-fix-your-color-blind-problems-on-android-devices-with-the-color-correction-mode-66e1c3949bf6, Feb. 23, 2017, 7 Pages.

Scibetta, Nicholas, "Nvidia's Freestyle Filters Can Add Colorblind Graphics Mode to Games", Retrieved from: https://gamecrate.com/nvidias-freestyle-filters-can-add-colorblind-graphics-mode-games/17830, Jan. 8, 2018, 9 Pages.

"NVIDIA Freestyle: Customize Your Game's Appearance in Real-Time"; Oct. 16, 2020; pp. 1-5; geforce.com.

Novak, John; "What Every Coder Should Know About Gamma"; Sep. 21, 2016; pp. 1-19; blog.johnnovak.net.

"International Search Report and Written Opinion Issued in PCT Application No. PCT/US2021/052340", dated Dec. 21, 2021, 22 Pages.

* cited by examiner

COLOR CORRECTION IN COMPUTING SYSTEMS FOR COLOR VISION DEFICIENCY

TECHNICAL BACKGROUND

Various forms color vision deficiencies occur in humans. These conditions are typically related to how well physical structures in retinas respond to various wavelengths of light. A combination of retinal structures, referred to as rods and cones, discriminate among intensity and colors. The cone structures have several different types, and each of these types are used to discriminate among different wavelengths of light, such as red, green, and blue. However, there is variation among individuals with regard to presence/absence of these retinal structures and how retinal structures, when present, respond to colors. Anomalous trichromacy refers to a diminished ability to see or discriminate hues (colors). There are typically three forms of anomalous trichromacy in which the retina is deficient in a particular type of cone structure that responds to a particular color, resulting in an inability (-anopia) or reduced ability (-anomaly) to perceive green (deuteranopia or deuteranomaly), inability to perceive red (protanopia or protanomaly), and inability to perceive blue (tritanopia or tritanomaly). Deuteranomaly, protanomaly, and tritanomaly individuals can typically still perceive associated colors but have a reduction in retinal sensitivity or a shifting of color sensitivity toward another color.

Computing systems can employ some form of visual interface, such as displays, projections, or touchscreens, to allow individuals to view visual media comprising applications, games, movies, pictures, and the like. When an individual has a color vision deficiency, it can be challenging to see user interface elements and graphical elements according to the intent of the visual media designers. Many computer systems do not have solutions to address deuteranomaly, protanomaly, and tritanomaly, which comprise the most common forms of colorblindness that includes individuals who have a range of ability to see a particular color between ~1% to 99%. These conditions are more difficult to correct for visually, and an on/off switch for color filters do not provide a one-size-fits-all solution. Also, many individuals do not realize they have anomaly-type colorblindness, or they do not know the exact type of colorblindness, making it difficult to apply solutions.

OVERVIEW

Discussed herein are enhanced technologies for providing color correction for computing systems and associated displays. This color correction is applied at the hardware level to already-rendered video frames and has minimal impact to system performance, while allowing for individualization of the color correction to address complex forms of anomalous trichromacy. In one example, a method includes receiving a video frame having a first non-linear transfer function and processing the video frame to have a linear transfer function. The method also includes applying a color transform to the video frame having the linear transfer function to produce at least altered color appearance parameters that increase color perceptibility of the video frame for a colorblindness condition, and processing the video frame after the color transform to have a second non-linear transfer function and produce an output video frame. The method also includes transferring the output video frame for display on a display device.

In another example, an input interface is configured to receive a video frame having a first non-linear transfer function. A color processor configured to process the video frame to have a linear transfer function, apply a color transform to the video frame having the linear transfer function to produce at least altered color appearance parameters that increase color perceptibility of the video frame for a colorblindness condition, and process the video frame after the color transform to have a second non-linear transfer function and produce an output video frame. An output interface configured to transfer the output video frame for display on a display device.

In yet another example, an apparatus includes one or more computer readable storage media, a processing system operatively coupled with the one or more computer readable storage media, and program instructions stored on the one or more computer readable storage media. Based on being read and executed by the processing system, the program instructions direct the processing system to at least receive a video frame, wherein the video frame has a first non-linear transfer function and a first color gamut. The program instructions also direct the processing system to process the video frame to have a linear transfer function and apply a color transform to the video frame having the linear transfer function to establish a second color gamut wider than the first color gamut and produce at least altered color appearance parameters that increase color perceptibility of the video frame for a colorblindness condition, wherein the altered color appearance parameters are incorporated into colors of the second color gamut. The program instructions also direct the processing system to process the video frame after the color transform to have a second non-linear transfer function and produce an output video frame, and transfer the output video frame for display on a display device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

When interacting with computing and gaming systems, users can employ some form of visual interface, such as displays, projections, or touchscreens, to view visual media comprising applications, games, movies, pictures, and the like. When an individual has a color vision deficiency, it can be challenging to see user interface elements and graphical elements according to the intent of the visual media designers. Some computer applications and games have software filters included to attempt to address color blindness, but these typically only address deuteranopia, protanopia, and tritanopia (three forms of colorblindness that are 100% in magnitude). However, many computing and gaming systems do not have solutions to address deuteranomaly, protanomaly, and tritanomaly, which comprise the most common forms of colorblindness that includes individuals who have a range of ability to see a particular color between ~1% to 99% or a shift in color perception among colors. These conditions are more difficult to correct for visually. Attempts at employing software filters to applications and games have been challenging due to the negative performance impact on latency of the graphics/display systems when changing the coloring of graphics in real-time at the software level.

The technology described herein can significantly enhance the image quality for colorblind or color vision deficient individuals of any images or video displayed by a computing system, which can include an already published or yet to be published video game. In one example, a video game might produce video frames with a standard dynamic range (SDR). The technology herein can transform, in real-time, each SDR image presented by the game into an image that is high dynamic range (HDR) with wider color gamut (WCG). Moreover, the conversion to HDR provides for incorporation of color adjustments of color appearance parameters for increased perceptibility by color vision deficient individuals. This results in a visual improvement when viewed by color vision deficient individuals and on an HDR capable display. The higher range of brightness or luminance and color values offered by HDR produces images with more detail visible in the bright and dark areas of the image. It also maintains color saturation in bright areas of the image as compared to SDR where bright colors can be desaturated. This technology does not require any extra engineering or content creation work from the game or application developer who originally produced the game or application. This technology could be used by an operating system to automatically enhance the visual quality of an existing game or application.

Figure 1:
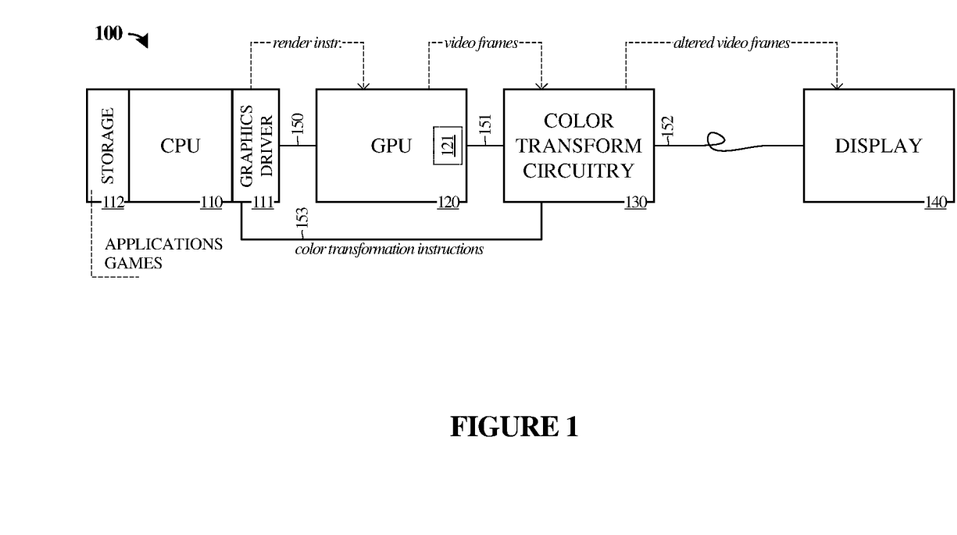
FIG. 1 illustrates a computing system in an implementation.

Turning to a first example implementation, FIG. 1 is presented. FIG. 1 includes computing system 100 comprising central processing unit (CPU) 110, graphics driver 111, storage system 112, graphics processing unit (GPU) 120, color transform circuitry 130, and display 140. CPU 110 and GPU 120 communicate over link 150, GPU 120 and color transform circuitry 130 communicate over link 151, and color transform circuitry 130 and display 140 communicate over link 152. In addition, CPU 110 is shown comprising graphics driver 111 and applications 112.

In operation, one or more applications stored on storage system 112 are executed by CPU 110, such as games, office productivity applications, streaming media applications, video conferencing applications, or other various applications that include graphical user interface elements, images, video, and other graphical or text features. While CPU 110 might handle generation and processing of such graphical aspects, at least some of the graphics processing workload can be directed to GPU 120 via graphics driver 111. GPU 120 comprises specialized circuitry dedicated to parallel execution of graphical processing units which handle rendering of images (referred to as video frames) into frame buffers 121. These video frames are transferred from frame buffers 121 over a display link for display to a user on a display device, such as on a monitor, headset, touchscreen, projector, or other display device. In this manner, a user can interact with a computing system or gaming system which displays resultant images onto a display device. To couple the user-level application or game to the graphics processing hardware, such as GPU 120, a graphics driver is typically employed. This graphics driver, shown as graphics driver 111 in FIG. 1, can be included within or in combination with an operating system and translates application-level instructions/requests into specialized hardware-level rendering instructions/requests suitable for the particular graphics rendering hardware employed, such as GPU 120.

However, in FIG. 1 an enhanced configuration is shown. This configuration includes color transform circuitry 130 which sits between GPU 120 and display 140. In examples where a GPU is not employed, or where GPU features are incorporated into a CPU, color transform circuitry 130 can be included between CPU 110 and display 140. In FIG. 1, GPU communicates over link 151 with color transform circuitry 130, and color transform circuitry 130 communicates with display 140 over link 152. Links 151-152 can comprise display links in some examples, such as a link suitable for transmission of rendered video frames in a particular physical layer implementation, which may include links internal or external to a chassis. In addition, link 153 can be included as a communication/control pathway between graphics driver 111 (via CPU 110) and color transform circuitry 130. Graphics driver 111 can provide color transformation instructions to color transform circuitry 130. These color transformation instructions can include color correction information, color gamut alteration commands, enable/disable commands, 3D lookup tables (3D LUTs), or other instructions and related information.

Color transform circuitry 130 processes video frames or images to apply transformations according to the color transformation instructions which alter color appearance parameters of the video frames, such as altering a color gamut, brightness, a video definition range, or other properties of video frames output by GPU 120. These adjustments to color appearance parameters can include adjustments to relative color-contrasts between color pairs (e.g. red vs green) that produce more contrast to a color vision deficient individual after a color transformation that better matches the experience of a non-color deficient individual. Color transform circuitry 130 then produces altered video frames as an output. These altered video frames are transferred over link 152 for display on display 140. The color transformations applied by color transform circuitry 130 can include transformations or alterations that increase a color perceptibility of the video frames for colorblind individuals, which may correspond to an increase in color perceptibility for at least one among a deuteranomaly, protanomaly, and tritanomaly condition. In other examples, the color transformations can alter a color perceptibility along with increasing a color gamut from a first color gamut to a second color gamut wider than the first color gamut. When combined with a wider color gamut, color perceptibility for a colorblindness condition can be increased further by leveraging the increased quantity of colors available in the wider color gamut.

A color gamut comprises a set of colors, which in some cases corresponds to a set of colors that can be accurately represented by a particular display technology or printed image technology. Often, a color gamut encompasses a limited subset of the total possible color range within the perceptibility limits of the human eye or color range of a given set of wavelengths of light. Various standards have been developed that define particular color gamuts, with many standards applied to particular computing systems, gaming systems, display types, or display link types. One example color gamut is defined by the standard Red Green Blue (sRGB) specification (also referred to as IEC 61966-2-1:1999). Another example color gamut is defined within the parameters of the ITU-R Recommendation BT.709, which is often employed for standard dynamic range (SDR) color gamuts and associated computer or television displays. More recent color standards include high dynamic range (HDR) color gamuts, which can be employed on HDR displays. Some HDR color gamut standards are defined within the parameters of the DCI-P3 (a.k.a. DCI/P3) or ITU-R Recommendation BT.2020. Color standards can also include a definition of a transfer function, referred to as a gamma correction or gamma. These transfer functions can define how particular colors are weighted or scaled to compensate for differences between emitted light intensity and human perceptual light intensity. Transfer functions can comprise linear or non-linear transfer functions. In the sRGB, BT.709, DCI-P3, and BT.2020 standards, a nonlinear transfer function is employed, which can be defined by a gamma curve.

Figure 2:
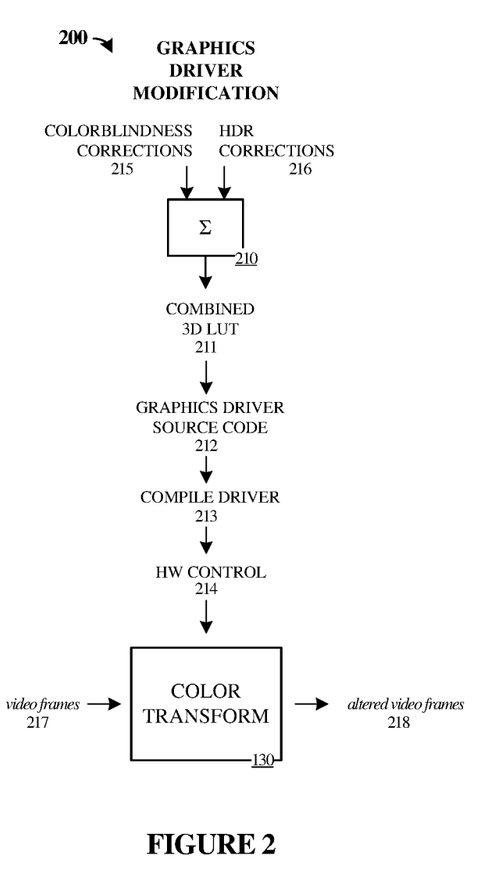
FIG. 2 illustrates color transformation operations in an implementation.
Figure 3:
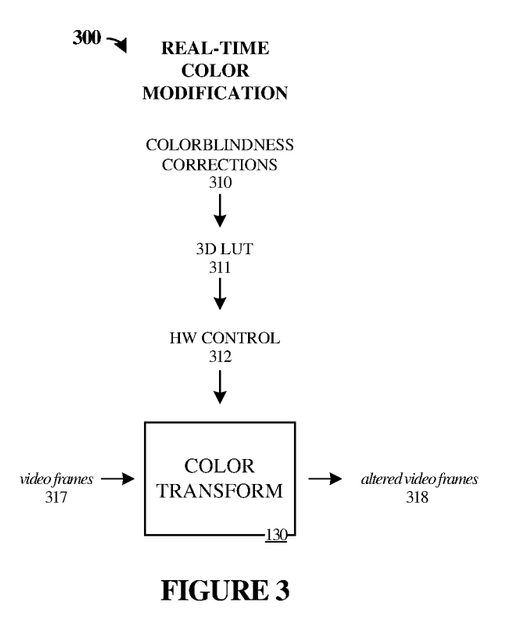
FIG. 3 illustrates color transformation operations in an implementation.

FIG. 2 and FIG. 3 illustrate two example sets of operations for computing system 100 of FIG. 1. FIG. 2 details a scenario where color transformation parameters are compiled into graphics driver 111 to control color transformations in color transform circuitry 130. FIG. 3 details a scenario where color transformation parameters are applied dynamically to color transform circuitry 130, bypassing compilation into graphics driver 111.

Turning first to FIG. 2, operations 200 include mathematical combination step 210 which takes as input colorblindness corrections 215 and optionally HDR corrections 216. Colorblindness corrections 215 comprise color transformations or filters that increase a color perceptibility of video frames for colorblind individuals, which may correspond to an increase in color perceptibility for a colorblindness condition comprising partial colorblindness. HDR corrections 216 comprise color gamut expansion operations or brightness adjustment operations which can create a wider color gamut for a given video frame. Colorblindness corrections 215 and HDR corrections 216 can be combined into a single set of corrections, which can comprise the color appearance parameters discussed herein. In a first example, colorblindness corrections 215 are made in after establishing the wider color gamut corresponding to HDR corrections 216. In other examples, colorblindness corrections 215 can be made in a color gamut corresponding to an SDR color space. However, making colorblindness corrections 215 in the wider color gamut typically leads to better results for colorblindness corrections in output video frames, due in part to the wider selection of colors from which to form the corrections. Step 210 comprises a mathematical combination of the two sets of corrections or filters, which might each comprise a 3D look-up table (LUT). The mathematical combination can include a summation of parameters comprising the two corrections, but may also include other mathematical operations. For example, a de-gamma operation might be performed on each of the color corrections or filters to transform the filters initially in a nonlinear representation into a linear representation. Colorblindness corrections 215 can then be applied to each color value among red, green, and blue (RGB) into color values with adjusted color appearance parameters to calibrate for deuteranomaly, protanomaly, or tritanomaly, among other colorblindness conditions. This produces combined color corrections (color appearance parameters) represented by combined 3D LUT 211 in FIG. 2, which comprises a 3D color space of RGB values.

Step 212 comprises injecting 3D LUT 211 into source code for graphics driver 111. The source code comprises uncompiled code in a particular programming language that forms graphics driver 111 once compiled/repackaged/redeployed. This source code can include a portion which instructs graphics hardware, such as color transform circuitry 130, to perform transformations on video frames. Once graphics driver 111 is compiled, in step 213, then 3D LUT 211 will be incorporated into graphics driver 111, and control (step 214) of graphics hardware during execution of applications or games can occur to produce the desired color corrections on the resultant video frames before display by display 140. Color transform circuitry 130 might have one or more control interfaces, application programming interfaces (APIs), or other interfaces. These interfaces can be used to communicate with graphics driver 111 to apply 3D LUT 211 to video frames 217 rendered by GPU 120 into frame buffer 121. Altered video frames 218 are then produced having the color values to correct for colorblindness conditions which can be made in a wider color gamut noted above.

Turning next to FIG. 3, operations 300 include as input colorblindness corrections 310 (and optionally HDR corrections). Colorblindness corrections 310 comprise color transformations or filters that increase a color perceptibility of video frames for colorblind individuals, which may correspond to an increase in color perceptibility for a colorblindness condition comprising partial colorblindness (e.g. deuteranomaly, protanomaly, or tritanomaly). A 3D LUT representation of colorblindness corrections 310 can be established, such as by taking color corrections or color adjustments presented in a first format and converting into a second format that corresponds to a 3D LUT representation. Colorblindness corrections can then be applied to each color value among red, green, and blue (RGB) into color values with adjusted color appearance parameters to calibrate for at least one among deuteranomaly, protanomaly, and tritanomaly. This produces color corrections represented by 3D LUT 311 in FIG. 3, which comprises a 3D color space of RGB values.

Step 312 comprises control of graphics hardware during execution of applications or games that occurs to produce the desired color corrections on the resultant video frames before display by display 140. Color transform circuitry 130 might have one or more control interfaces, APIs, or other interfaces. These interfaces can be used to communicate with graphics driver 111 to apply 3D LUT 311 in color transform circuitry 130 to video frames 317 rendered by GPU 120 into frame buffer 121. Altered video frames 318 are then produced having the color values to correct for at least one among deuteranomaly, protanomaly, and tritanomaly which can be made in a wider color gamut noted above.

Advantageously, color adjustments are implemented by hardware represented by color transform circuitry 130, and not within a software layer, application layer, or even graphics driver layer of a computing system. Because of this, the color adjustments minimally impact application/game performance or operating system performance unlike software-level color adjustments might (i.e. at the application or driver levels). By using one or more 3D LUT settings, color transform circuitry 130 can be controlled to make color adjustments to the entire computing system or gaming console, or to particular games or applications, as well as on a per-user basis. For example, a default 3D LUT can be applied which does not include colorblindness corrections, and when a particular user or application is present then another colorblindness-oriented 3D LUT can be applied by color transform circuitry 130. Also, the hardware-level corrections can be made without compromising performance or the user experience, and adding colorblindness color enhancement plus HDR can add additional features that make colors more visible, saturated, and bright as appropriate for variants of colorblindness.

Returning to a discussion on the elements of FIG. 1, CPU 110 can include various circuitry, logic, processing elements, memory elements, storage elements, and communication interfaces. CPU 110 can comprise one or more microprocessors, microcontrollers, field-programmable gate arrays (FPGAs), application specific integrated circuits (ASICs), discrete logic, or other elements. CPU 110 can be implemented within a single processing device but can also be distributed across multiple processing devices or subsystems that cooperate in executing program instructions. Examples of CPU 110 include general purpose central processing units, application specific processors, and logic devices, as well as any other type of discrete circuitry, control logic, or processing device, including combinations, or variations thereof. CPU 110 might include one or more peripheral interfaces, memory interfaces, storage interfaces, and network interfaces for communicating over associated links.

GPU 120 can comprise graphics processors, shaders, pixel render elements, frame buffers, texture mappers, graphics cores, graphics pipelines, graphics memory, or other graphics processing and handling elements. In some examples, GPU 120 comprises a graphics 'card' comprising circuitry that supports a GPU chip along with various other circuitry, connectors, and other elements. In further examples, other style of graphics processing units or graphics processing assemblies can be employed, such as machine learning processing units, tensor processing units (TPUs), or other specialized data processors that may include similar elements as GPUs.

Storage system 112 comprises a non-transitory data storage system, although variations are possible. Storage system 112 can comprise any storage media readable by processing circuitry 311 and capable of storing software and OS images. Storage system 112 can include random access memory (RAM) comprising volatile and nonvolatile, removable and non-removable media implemented in any method or technology for storage of information, such as computer readable instructions, data structures, program modules, or other data. Storage system 112 can include non-volatile storage media, such as solid-state storage media, flash memory, crosspoint memory, phase change memory, or magnetic memory, including combinations thereof. Storage system 112 can be implemented as a single storage device but can also be implemented across multiple storage devices or sub-systems. Storage system 112 can comprise additional elements, such as controllers, capable of communicating with CPU 110. Software or data stored on or in storage system 112 can comprise computer program instructions, firmware, or some other form of machine-readable processing instructions having processes that when executed by a processing system, direct the processing system to operate as described herein.

Links 150-153 can comprise one or more communication links, such as one or more data links comprising wireless or wired links. Links 150-153 can comprise various logical, physical, or application programming interfaces. Example links can use metal, glass, optical, air, space, or some other material as the transport media. Links 150-151 can use various data protocols and formats, such as Peripheral Component Interconnect Express (PCIe), Gen-Z, Ethernet, InfiniBand, NVMe, Internet Protocol (IP), Serial Attached SCSI (SAS), FibreChannel, Thunderbolt, Serial Attached ATA Express (SATA Express), NVIDIA® NVLink®, Cache Coherent Interconnect for Accelerators (CCIX), Compute Express Link (CXL), Open Coherent Accelerator Processor Interface (OpenCAPI), wireless Ethernet or Wi-Fi (802.11x), or cellular wireless technologies, among others. Link 152 can use various display protocols and formats, such as High-Definition Multimedia Interface (HDMI), Video Electronics Standards Association DisplayPort, Mobile Industry Processor Interface (MIPI) Alliance Display Serial Interface (DSI), Digital Visual Interface (DVI), Wireless Display (WiDi), Miracast, Video Graphics Array (VGA) interfaces, wireless display interfaces, or other digital and analog video links including interface types that are transported over other types of links. In some examples, video data can be transported over link 152 using various data protocols, such as Internet Protocol (IP), Ethernet, hybrid fiber-coax (HFC), WiFi (IEEE 802.11), Bluetooth, other wired or wireless data interfaces, or some other communication format, including combinations, improvements, or variations thereof. Link 152 can include direct links or may include intermediate networks, systems, or devices, and can include a logical network link transported over multiple physical links. Link 152 can include routers, switches, bridges, traffic handling nodes, and the like for transporting traffic among endpoints.

Figure 4:
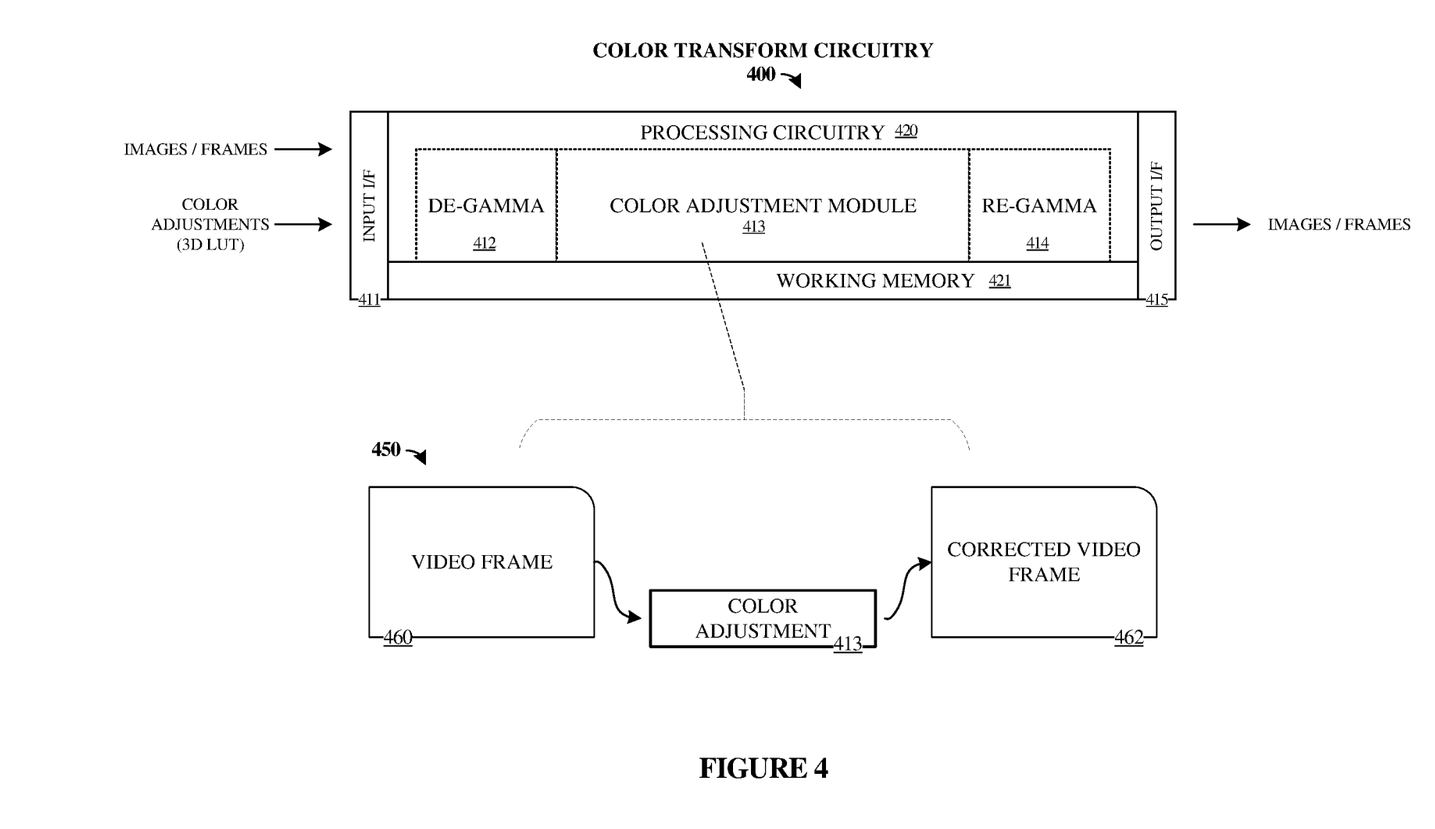
FIG. 4 illustrates a color transformation system in an implementation.

FIG. 4 is presented to illustrate one example implementation of color transform circuitry 130, although variations are possible. Color transform circuitry 400 includes input interface 411 and output interface 415, along with processing circuitry 420 and working memory 421. Working memory 421 is employed by processing circuitry 420 for use by any of modules 412-414 to operate on one or more video frames or images currently being handled by processing circuitry 420. Working memory 421 can comprise a buffer or cache, among other implementations.

Processing circuitry 420 can implement various functional modules, some of which are included in FIG. 4. These functional modules include de-gamma 412, color adjustment module 413, and re-gamma 414. The various functional modules of processing circuitry 420 can comprise discrete logic/circuitry or software/firmware-implemented entities. Processing circuitry 420 comprises various logic, processing elements, memory elements, storage elements, and communication interfaces. Processing circuitry 420 can comprise one or more microprocessors, microcontrollers, field-programmable gate arrays (FPGAs), application specific integrated circuits (ASICs), discrete logic, or other elements. Processing circuitry 420 can be implemented within a single processing device but can also be distributed across multiple processing devices or sub-systems that cooperate in executing program instructions. Examples of processing circuitry 420 include general purpose central processing units, application specific processors, and logic devices, as well as any other type of discrete circuitry, control logic, or processing device, including combinations, or variations thereof. Processing circuitry 420 might include one or more peripheral interfaces, memory interfaces, storage interfaces, and network interfaces for communicating over associated links.

To discuss the operation of elements of FIG. 4, operational scenario 450 is presented in FIG. 4. In FIG. 4, video frame 460 is received over input interface 411. Processing circuitry 420 then implements one or more color corrections and color gamut adjustments in color adjustment module 413 to produce corrected video frame 462. Corrected video frame 462 is transferred via output interface 415 for display. Processing circuitry 420 received video frame 460 in a first configuration, which might include a particular color scheme, color gamut, and gamma configuration. The gamma configuration can correspond to a non-linear representation of color information carried by the video frame. De-gamma operation 412 converts the non-linear representation into a linear representation, such as those mentioned above. Then, color adjustment module 413 implements one or more color adjustments as received over input interface 411. These color adjustments can take the form of a 3D LUT, among other representations. The 3D LUT can be generated according to the processes described above or in FIG. 5 below. In one example, RGB color values of the linearized version of video frame 460 are used as indices in a 3D LUT to determine resultant RGB color values from the 3D LUT. Once these resultant color values are determined, then re-gamma operation 414 produces a non-linear representation of the video frame, noted as corrected video frame 462 in FIG. 4. Output interface 415 can transfer corrected video frame 462 for display. Working memory 421 can be employed to store input video frames, corrected video frames, intermediary video frames, and color correction information (such as 3D LUTs).

Figure 5:
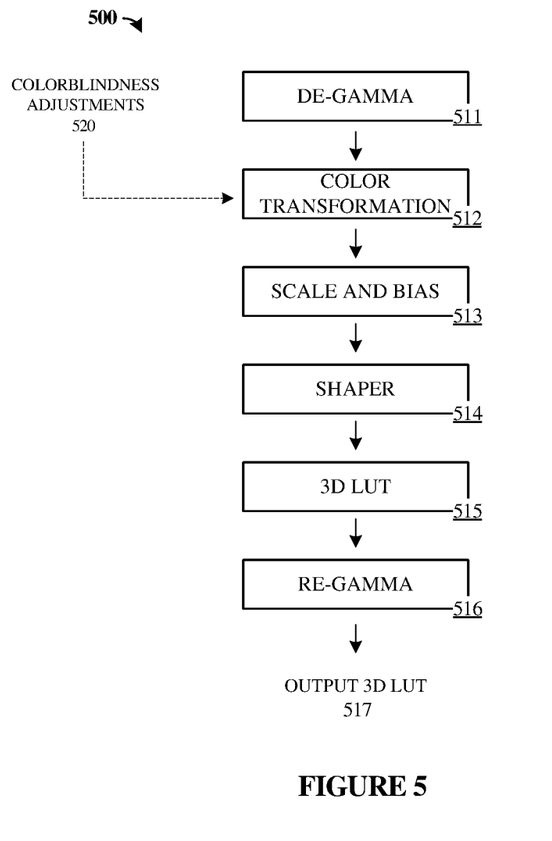
FIG. 5 illustrates color transformation operations in an implementation.

FIG. 5 illustrates operations 500 for generating color adjustment information, which in this example comprises a 3D LUT. This 3D LUT can be employed in various colorblindness color correction operations as well as in combination with color gamut transformation operations. As an input, operations 500 can take a color filter or color representation for RGB color handling employed by a computing system or gaming system. The 3D LUT produced as an output from operations 500 can be employed as color transformation instructions to color transformation circuitry 130 or color adjustment module 413, for example. Thus, operations 500 generate a 3D LUT which is applied to rendered video frames to alter color configurations of those video frames prior to display to a user.

Operation 511 performs a de-gamma operation on a source color filter. In this example, the de-gamma operation comprises transforming a color space of the color filter from having a non-linear transfer function, or gamma, to having a linear transfer function. This can also be referred to as taking the source color filter in a gamma-compressed state and transforming into a gamma-expanded state. In one instance, the gamma-compressed state might comprise a gamma curve defined by SMPTE ST 2084 (ST.2084) (or EOTF for HDR10 displays) which comprises a non-linear transfer function. Other instances might have the gamma-compressed state comprising a gamma curve defined by the sRGB format (Rec.709 color space). Other gamma curves or gamma-compressed states are possible.

Operation 512 then incorporates one or more color transformations into the color filter while in the linear representation. These color transformations can include colorblindness adjustments 520 for color blindness conditions (e.g. full or partial colorblindness), among other color blindness conditions. These color transformations can also comprise color gamut adjustments to expand a color gamut and convert an SDR representation into an HDR representation. Since the color filter at operation 512 is in the linear representation, linear mathematical operations can be applied to combine values of the color filter with color adjustments of the colorblindness adjustments or color gamut adjustments. These mathematical operations can include various algebraic, linear algebraic, or matrix manipulation style of operations. The colorblindness adjustments can comprise adjustments to individual color values affected by the color filter. The colorblindness adjustments might be made after the color filter is first altered to establish a wider color gamut or brightness adjustments, such as to establish an HDR representation from an SDR representation. In such cases, the colorblindness adjustments for saturation/brightness can be applied to HDR-supported colors—which might not have been previously supported by the color gamut of the SDR representation.

Color gamut expansion along with brightness adjustment operations can be employed in the color adjustment hardware discussed herein, and can be employed in combination with one or more colorblindness adjustments. Colors in computing systems are normally represented as three values, one each for the red, green and blue (RGB) channels. The luminance of such colors can be calculated in different ways, and represents the intensity of the color with a single value. One of the benefits from wider color gamut schemes, such as HDR, is that individuals can see more detail in the bright and dark areas of an image. SDR displays typically represent colors in the Rec.709 color space. This represents a very small range of colors that the human eye can perceive. The specification for HDR displays allows HDR displays to represent a much larger range of color values, by using the Rec.2020 color space. This results in an image that is much more natural, detailed and colorful. Since SDR images are created to be shown on SDR displays, the color values are defined in the Rec.709 color space. Color gamut expansion can thus refer to the process of transforming colors in the Rec.709 color space to color values that go outside of the Rec.709 color space. Several ways for gamut expansion exist, but many are not efficient enough to apply in software for user applications, such as games.

Operations 513 and 514 comprise scale/bias and shaper operations. These operations adjust the color filter to fit target a target precision, target color saturation range, or target luminance range of a display type or display technology. A target display device, display technology, or display link type might only support a particular color gamut, color saturation range, luminance range, or other property different than that of the color filter. The color filter is further adjusted to compensate for these limitations, such as by scaling (expanding/reducing) and biasing the color value ranges in the color filter to suit a target precision, target color saturation range, or target luminance range. Finally, operation 515 generates a 3D LUT representation of the color filter. This representation allows for transformation of video frames on-the-fly using look-up operations to convert one RGB color value indicated by a video frame into another RGB color value according to the 3D LUT. However, a re-gamma operation 516 is first performed before this 3D LUT is produced as output 3D LUT 517. The re-gamma operation converts the 3D LUT into a gamma-compressed state or non-linear representation appropriate for the target color space. This gamma-compressed state can comprise the same gamma-compressed state as initially received in operation 511. However, a different gamma-compressed state can instead be employed. For example, the target color space might have a gamma curve associated therewith, and operation 516 takes the 3D LUT and makes this 3D LUT compatible with the gamma curve. Output 3D LUT 517 can thus be employed by color transformation hardware to adjust video frames on-the-fly to correct for colorblindness conditions as well as optionally to expand a color gamut of the video frame.

Figure 6:
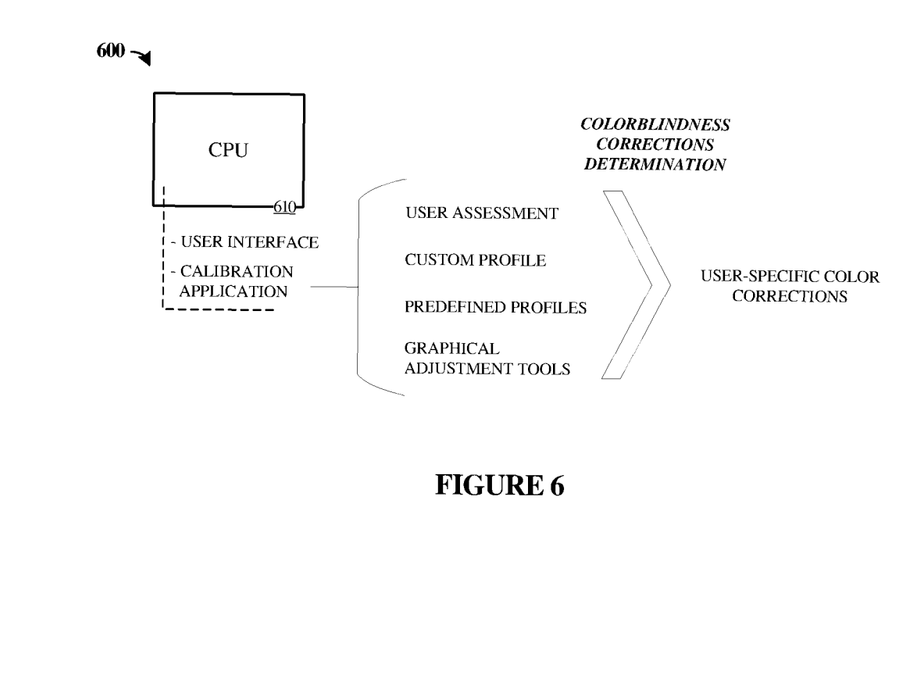
FIG. 6 illustrates user calibration operations in an implementation.

FIG. 6 illustrates an example implementation of a user interface for user-defined color transformations. Color adjustments can be tailored and modified on a per-user basis, a per-application basis, or on a global system basis. When on a per-user basis, a user profile can be created for a user, and responsive to sign-in of a user identity to a gaming system or operating system, this user profile can be loaded from storage (local storage as well as online/cloud/remote storage) and applied to instruct color transform circuitry to operate accordingly.

In system 600, an example CPU 610 is included which executes a user interface and calibration application. The calibration application performs a user assessment by accepting various user inputs to determine user-appropriate color adjustments. The calibration application can employ calibration routines comprising surveys, tests, questionnaires, sequences of images for comparison, or other similar features which allow for computer-guided determination of color corrections that are preferred for a particular user. Color filters can be adjusted and modified into sliders or other user interface elements in the user interface that allow a user to customize a visual experience based on their individual needs, at the same time helping them to realize what type of colorblindness corrections needed or colorblindness degree they may be experiencing. Rather than an on/off switch or a one-size-fits all solution that requires a user to know what type of colorblindness they have or that does not fit their unique needs, these calibration routines can guide users through a customization process. Users do not have to rely on individual games to provide color correction solutions, instead the color corrections can be offered to every user on a computing/gaming system. A custom profile can be established from the results of these calibration routines and user assessments, which allows users to tie color correction sets to particular users, applications, games, displays, or other 'profiles' that can be dynamically selected via user interface elements or automatically selected as needed upon execution of particular applications/games, sign-in of particular users, and the like. The color correction settings can be stored in the cloud with a user profile, for instant access when signing into any gaming system during roaming instances.

Figure 7:
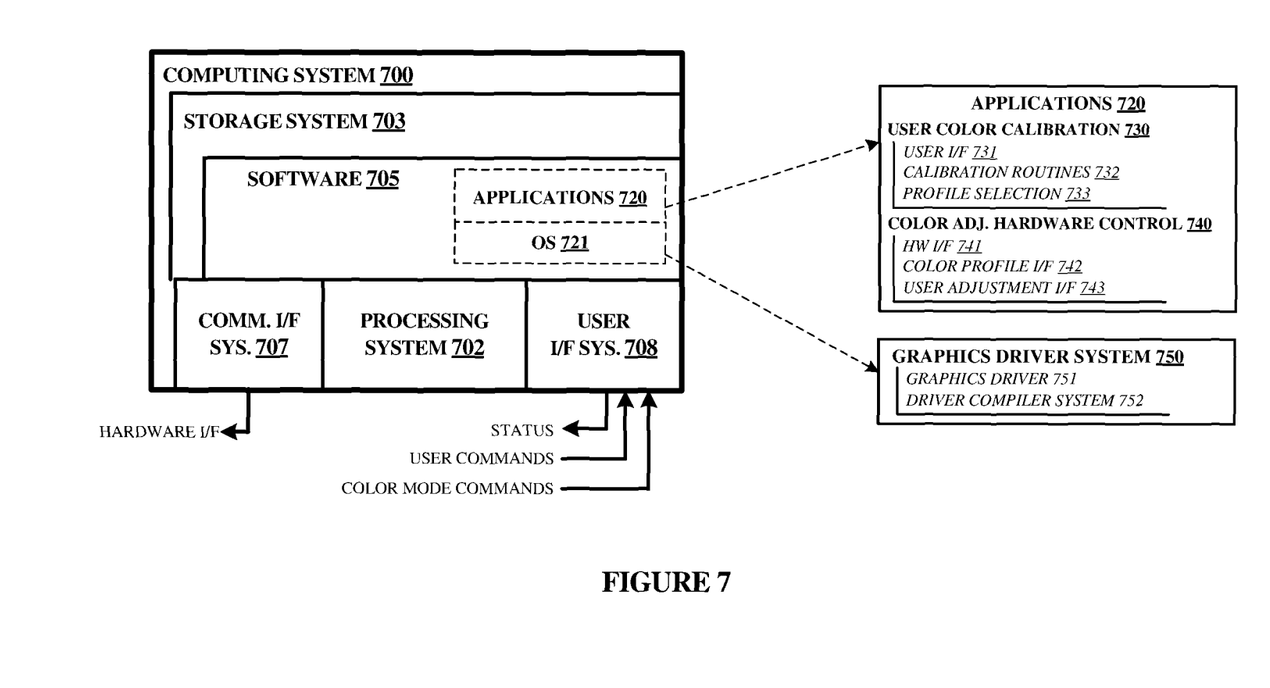
FIG. 7 illustrates computing system and software in an implementation.

FIG. 7 illustrates computing system 700 and associated software 705 in an implementation. FIG. 7 illustrates computing system 700 that is representative of any system or collection of systems in which the various operational architectures, scenarios, and processes disclosed herein may be implemented. For example, computing system 700 can be used to implement elements of CPU 110, graphics driver 111, or color transform circuitry 130 of FIG. 1, color transform circuitry 400 of FIG. 4, any of the operations to generate a 3D LUT found in FIG. 5, or elements of system 600 of FIG. 6, although variations are possible. In some implementations, more than one system similar to that of computing system 700 are employed. However, the example in FIG. 7 shows a combined control system having corresponding software-based control elements.

Computing system 700 may be implemented as a single apparatus, system, or device or may be implemented in a distributed manner as multiple apparatuses, systems, or devices. Computing system 700 includes, but is not limited to, processing system 702, storage system 703, software 705, communication interface system 707, and user interface system 708. Processing system 702 is operatively coupled with storage system 703, communication interface system 707, and user interface system 708.

Processing system 702 loads and executes software 705 from storage system 703. Software 705 includes applications 720 and operating system (OS) 721, which are representative of the processes, services, and platforms discussed with respect to the included Figures. When executed by processing system 702 to provide user color calibration, color adjustment hardware control, and graphics driver services, among other services, software 705 directs processing system 702 to operate as described herein for at least the various processes, operational scenarios, and sequences discussed in the foregoing implementations. Computing system 700 may optionally include additional devices, features, or functionality not discussed for purposes of brevity.

Referring still to FIG. 7, processing system 702 may comprise a microprocessor and processing circuitry that retrieves and executes software 705 from storage system 703. Processing system 702 may be implemented within a single processing device but may also be distributed across multiple processing devices or subsystems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions comprising applications 720 and operating system 721 that provide user color calibration, color adjustment hardware control, and graphics driver services, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include applications 720. Software 705 may also comprise firmware or some other form of machine-readable processing instructions executable by processing system 702.

Software 705, when loaded into processing system 702 and executed, may transform a suitable apparatus, system, or device (of which computing system 700 is representative) overall from a general-purpose computing system into a special-purpose computing system customized to provide user color calibration, color adjustment hardware control, and graphics driver services, among other services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors. For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 720 can include user color calibration 730 and color adjustment hardware control 740. OS 721 includes graphics driver system 750. Applications 720 can include portions of graphics driver system 750, such as a compiler or user interface for interfacing with a compiler and source code editing. Application 720 and OS 721 only show one example implementation of the associated components. Other examples might comprise different implementations, which can vary based on the particular computing system, gaming system, operating system type, and particular set of features desired for implementation. One example implementation might have applications 720 comprising one or more applications or software components that run on top of OS 721 as system-level applications separated from other user-level applications. For example, applications 720 might have access to private APIs to communicate directly with a graphics driver in OS 721, at a level that is not exposed to other user applications.

User color calibration 730 includes user interface 731, calibration routines 732, and profile selection 733. User interface 731 includes graphical or textual interface elements for allowing a user or determine color adjustments. The color adjustments might provide an increase in color perceptibility or color appearance of video frames for a colorblind individual and corresponds to an increase in color perceptibility for a deuteranomaly, protanomaly, or tritanomaly condition comprising partial deuteranopia. The user interface elements can employ calibration routines 732 comprising surveys, tests, questionnaires, sequences of images for comparison, or other similar features which allow for computer-guided determination of color corrections that are preferred for a particular user. Profile selection 733 allows users to tie color correction sets to particular users, applications, games, displays, or other 'profiles' that can be dynamically selected via user interface elements or automatically selected as needed upon execution of particular applications/games, sign-in of particular users, and the like.

Color adjustment hardware control 740 includes hardware interface 741, color profile interface 742, and user adjustment interface 743. Hardware interface 741 interfaces with color adjustment hardware, such as hardware circuitry used to adjust video frames according to desired color intensity adjustments or color gamut adjustments. Hardware interface 741 might provide indications of 3D LUTs, enable/disable signaling, profile switching (if supported in hardware), among other indications. In some examples, hardware interface 741 is included in portions of graphics driver system 750 or communicates with hardware elements by way of portions of graphics driver system 750. Color profile interface 742 provisions for the storage and retrieval of previously determined sets of color corrections which might have been tied to particular users, applications, games, displays, or other 'profiles' that can be dynamically selected via user interface elements or automatically selected as needed upon execution of particular applications/games, sign-in of particular users, and the like. User adjustment interface 743 allows for low-level user control of color corrections, such as in debug or testing modes. User adjustment interface 743 might allow for A/B testing among color correction profiles, or for fine grain tuning on top of color correction profiles. User adjustment interface 743 can allow these user changes to be incorporated into stored sets of color corrections.

Graphics driver system 750 includes graphics driver 751 and driver compiler system 752. Graphics driver 751 interfaces with graphics processing hardware (e.g. GPU) and provides instructions to the graphics processing hardware to render video frames according to the operations of applications or games. Graphics driver 751 may include color correction features which allow for the usage of user-supplied 3D LUTs or other similar data structures to control color adjustment hardware after rendering of video frames by graphics processing hardware. Moreover, driver compiler system 752 can provide for modification or editing of source code of graphics driver 751 for inclusion of 3D LUTs into graphics driver 751 which can be later used to control color adjustment hardware after rendering of video frames by graphics processing hardware.

Communication interface system 707 may include communication connections and devices that allow for communication with other computing systems or electrical components (not shown) over communication links or communication networks (not shown). Examples of connections and devices that together allow for inter-system communication may include transceivers, data bus interfaces, network interface controllers, antennas, power amplifiers, RF circuitry, display interfaces, and other communication circuitry. The connections and devices may communicate over communication media to exchange communications with other computing systems or networks of systems, such as metal, glass, air, or any other suitable communication media. Physical or logical elements of communication interface system 707 can receive link/quality metrics and provide link/quality alerts or telemetry outputs to users or other operators.

Communication between computing system 700 and other elements or systems (not shown), may occur over communication links or communication networks and in accordance with various communication protocols, combinations of protocols, or variations thereof. For example, computing system 700 might communicate with elements over corresponding digital communication links comprising data buses, Ethernet interfaces, serial interfaces, serial peripheral interface (SPI) links, inter-integrated circuit (I2C) interfaces, universal serial bus (USB) interfaces, UART interfaces, display interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 708 may include a software or virtual interface such as a terminal interface, command line interface, or application programming interface (API). User interface system 708 may also include physical user interfaces, such as keyboard, a mouse, a voice input device, or a touchscreen input device for receiving input from a user. User interface system 708 may include color calibration interfaces, color adjustment interfaces, color profile selection interfaces, or graphics driver control interfaces, among others. Output devices such as displays, speakers, web interfaces, terminal interfaces, and other types of output devices may also be included in user interface system 708. User interface system 708 can provide output and receive input over a network interface, such as communication interface system 707. In network examples, user interface system 708 might packetize data for receipt by a display system or computing system coupled over one or more network interfaces. User interface system 708 may comprise API elements for interfacing with users, other data systems, other user devices, web interfaces, and the like. User interface system 708 may also include associated user interface software executable by processing system 702 in support of the various user input and output devices discussed above. Separately or in conjunction with each other and other hardware and software elements, the user interface software and user interface devices may support a console user interface, graphical user interface, a natural user interface, or any other type of user interface.

Certain inventive aspects may be appreciated from the foregoing disclosure, of which the following are various examples.

Example 1: A method, comprising receiving a video frame having a first non-linear transfer function, processing the video frame to have a linear transfer function, applying a color transform to the video frame having the linear transfer function to produce at least altered color appearance parameters that increase color perceptibility of the video frame for a colorblindness condition, processing the video frame after the color transform to have a second non-linear transfer function and produce an output video frame, and transferring the output video frame for display on a display device.

Example 2: The method of Example 1, where the video frame is received from a graphics processor and comprises a first color gamut, and where the color transform establishes a second color gamut wider than the first color gamut.

Example 3: The method of Examples 1-2, where the altered color appearance parameters are incorporated into colors of the second color gamut.

Example 4: The method of Examples 1-3, where the first color gamut comprises a standard dynamic range (SDR) color gamut, and where the second color gamut comprises a high dynamic range (HDR) color gamut that incorporates the altered color appearance parameters.

Example 5: The method of Examples 1-4, further comprising receiving the color correction as a 3D lookup table (3D LUT) provided by a graphics driver associated with an application that generates graphics data comprising the video frame.

Example 6: The method of Examples 1-5, where the 3D LUT is established as a mathematical combination of a color blindness correction table indicating the altered color appearance parameters that increase color perceptibility of the video frame for the colorblindness condition and an additional correction table that expands a color gamut range of the video frame.

Example 7: The method of Examples 1-6, where the video frame is provided by a graphics processor after a shader process of the graphics processor.

Example 8: The method of Examples 1-7, where the increase in color perceptibility of the video frame for the colorblindness condition corresponds to an increase in color perceptibility for at least one among a deuteranomaly, protanomaly, and tritanomaly condition.

Example 9: The method of Examples 1-8, where the first non-linear transfer function corresponds to the ITU-R Recommendation BT.709 color space, where the linear transfer function corresponds to a linear RGB color space, and where the second non-linear transfer function corresponds to the DCI-P3 or ITU-R Recommendation BT.2020 color space.

Example 10: An apparatus, comprising an input interface configured to receive a video frame having a first non-linear transfer function, and a color processor configured to process the video frame to have a linear transfer function, and apply a color transform to the video frame having the linear transfer function to produce at least altered color appearance parameters that increase color perceptibility of the video frame for a colorblindness condition. The color processor is configured to process the video frame after the color transform to have a second non-linear transfer function and produce an output video frame. An output interface is configured to transfer the output video frame for display on a display device.

Example 11: The apparatus of Example 10, where the video frame is received from a graphics processor and comprises a first color gamut, and where the color transform establishes a second color gamut wider than the first color gamut.

Example 12: The apparatus of Examples 10-11, where the altered color appearance parameters are incorporated into colors of the second color gamut.

Example 13: The apparatus of Examples 10-12, where the first color gamut comprises a standard dynamic range (SDR) color gamut, and where the second color gamut comprises a high dynamic range (HDR) color gamut that incorporates the altered color appearance parameters.

Example 14: The apparatus of Examples 10-13, where the color correction comprises a 3D lookup table (3D LUT) provided by a graphics driver associated with an application that generates graphics data comprising the video frame.

Example 15: The apparatus of Examples 10-14, where the 3D LUT is established as a mathematical combination of a color blindness correction table indicating the altered color appearance parameters that increase color perceptibility of the video frame for the colorblindness condition and an additional correction table that expands a color gamut range of the video frame.

Example 16: The apparatus of Examples 10-15, where the video frame is provided by a graphics processor after a shader process of the graphics processor.

Example 17: The apparatus of Examples 10-16, where the increase in color perceptibility of the video frame for the colorblindness condition corresponds to an increase in color perceptibility for at least one among a deuteranomaly, protanomaly, and tritanomaly condition.

Example 18: The apparatus of Examples 10-17, where the first non-linear transfer function corresponds to the ITU-R Recommendation BT.709 color space, where the linear transfer function corresponds to a linear RGB color space, and where the second non-linear transfer function corresponds to the DCI-P3 or ITU-R Recommendation BT.2020 color space.

Example 19: An apparatus, comprising one or more computer readable storage media, a processing system operatively coupled with the one or more computer readable storage media, and program instructions stored on the one or more computer readable storage media. Based on being read and executed by the processing system, the program instructions direct the processing system to at least receive a video frame, where the video frame has a first non-linear transfer function and a first color gamut, process the video frame to have a linear transfer function, and apply a color transform to the video frame having the linear transfer function to establish a second color gamut wider than the first color gamut and produce at least altered color appearance parameters that increase color perceptibility of the video frame for a colorblindness condition, where the altered color appearance parameters are incorporated into colors of the second color gamut. The program instructions also direct the processing system to process the video frame after the color transform to have a second non-linear transfer function and produce an output video frame, and transfer the output video frame for display on a display device.

Example 20: The apparatus of Example 19, where the color correction comprises a 3D lookup table (3D LUT) provided by a graphics driver associated with an application that generates graphics data comprising the video frame, and where the 3D LUT is established as a mathematical combination of a color blindness correction table indicating the altered color appearance parameters that increase color perceptibility of the video frame for the colorblindness condition and an additional correction table that expands a color gamut range of the video frame The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   receiving a color transform as a 3D lookup table (3D LUT) provided by a graphics driver associated with an application that generates graphics data comprising a video frame, wherein the 3D LUT is established as a mathematical combination of a color blindness correction table indicating altered color appearance parameters that increase color perceptibility of the video frame for a colorblindness condition and an additional correction table that expands a color gamut range of the video frame;
   receiving the video frame having a first non-linear transfer function;
   processing the video frame to have a linear transfer function;
   applying the color transform to the video frame having the linear transfer function to produce at least the altered color appearance parameters;
   processing the video frame after the color transform to have a second non-linear transfer function and produce an output video frame; and
   transferring the output video frame for display on a display device.

2. The method of claim 1, wherein the video frame is received from a graphics processor and comprises a first color gamut, and wherein the color transform establishes a second color gamut wider than the first color gamut.

3. The method of claim 2, wherein the altered color appearance parameters are incorporated into colors of the second color gamut.

4. The method of claim 2, wherein the first color gamut comprises a standard dynamic range (SDR) color gamut, and wherein the second color gamut comprises a high dynamic range (HDR) color gamut that incorporates the altered color appearance parameters.

5. The method of claim 1, wherein the video frame is provided by a graphics processor after a shader process of the graphics processor.

6. The method of claim 1, wherein the increase in color perceptibility of the video frame for the colorblindness condition corresponds to an increase in color perceptibility for at least one among a deuteranomaly, protanomaly, and tritanomaly condition.

7. The method of claim 1, wherein the first non-linear transfer function corresponds to the ITU-R Recommendation BT.709 color space, wherein the linear transfer function corresponds to a linear RGB color space, and wherein the second non-linear transfer function corresponds to the DCI-P3 or ITU-R Recommendation BT.2020 color space.

8. An apparatus, comprising:
an input interface configured to:
receive a color transform as a 3D lookup table (3D LUT) provided by a graphics driver associated with an application that generates graphics data comprising a video frame, wherein the 3D LUT is established as a mathematical combination of a color blindness correction table indicating altered color appearance parameters that increase color perceptibility of the video frame for a colorblindness condition and an additional correction table that expands a color gamut range of the video frame;
receive the video frame having a first non-linear transfer function; and
a color processor configured to:
process the video frame to have a linear transfer function;
apply the color transform to the video frame having the linear transfer function to produce at least the altered color appearance parameters;
process the video frame after the color transform to have a second non-linear transfer function and produce an output video frame; and
an output interface configured to transfer the output video frame for display on a display device.

9. The apparatus of claim 8, wherein the video frame is received from a graphics processor and comprises a first color gamut, and wherein the color transform establishes a second color gamut wider than the first color gamut.

10. The apparatus of claim 9, wherein the altered color appearance parameters are incorporated into colors of the second color gamut.

11. The apparatus of claim 9, wherein the first color gamut comprises a standard dynamic range (SDR) color gamut, and wherein the second color gamut comprises a high dynamic range (HDR) color gamut that incorporates the altered color appearance parameters.

12. The apparatus of claim 8, wherein the video frame is provided by a graphics processor after a shader process of the graphics processor.

13. The apparatus of claim 8, wherein the increase in color perceptibility of the video frame for the colorblindness condition corresponds to an increase in color perceptibility for at least one among a deuteranomaly, protanomaly, and tritanomaly condition.

14. The apparatus of claim 8, wherein the first non-linear transfer function corresponds to the ITU-R Recommendation BT.709 color space, wherein the linear transfer function corresponds to a linear RGB color space, and wherein the second non-linear transfer function corresponds to the DCI-P3 or ITU-R Recommendation BT.2020 color space.

15. An apparatus, comprising:
one or more computer readable storage media;
program instructions stored on the one or more computer readable storage media, the program instructions executable by a processing system to direct the processing system to at least:
receive a color transform as a 3D lookup table (3D LUT) provided by a graphics driver associated with an application that generates graphics data comprising a video frame, wherein the 3D LUT is established as a mathematical combination of a color blindness correction table indicating altered color appearance parameters that increase color perceptibility of the video frame for a colorblindness condition and an additional correction table that expands a color gamut range of the video frame;
receive the video frame, wherein the video frame has a first non-linear transfer function and a first color gamut;
process the video frame to have a linear transfer function;
apply the color transform to the video frame having the linear transfer function to establish a second color gamut wider than the first color gamut and produce at least the altered color appearance parameters, wherein the altered color appearance parameters are incorporated into colors of the second color gamut;
process the video frame after the color transform to have a second non-linear transfer function and produce an output video frame; and
transfer the output video frame for display on a display device.

* * * * *